United States Patent [19]

Uryu et al.

[11] Patent Number: 5,972,159
[45] Date of Patent: Oct. 26, 1999

[54] OPTICAL RECORDING DISC RECYCLING METHOD

[75] Inventors: Masaru Uryu, Chiba; Kunihiko Tokura; Jun Kishigami, both of Saitama, all of Japan

[73] Assignee: Sony Corporation, Tokyo, Japan

[21] Appl. No.: 09/032,045

[22] Filed: Feb. 27, 1998

[30] Foreign Application Priority Data

Feb. 28, 1997 [JP] Japan ................... 9-046783

[51] Int. Cl.⁶ .................................................. B32B 35/00
[52] U.S. Cl. ..................... 156/344; 156/584; 29/239; 29/426.5
[58] Field of Search ................... 156/344, 584; 29/426.1, 426.3, 426.5, 239; 264/36.1, 36.13, 36.18

[56] References Cited

U.S. PATENT DOCUMENTS

| | | |
|---|---|---|
| 4,861,411 | 8/1989 | Tezuka ................... 156/344 |
| 5,006,190 | 4/1991 | Earle ........................ 156/247 |
| 5,220,754 | 6/1993 | Tayebi et al. ............... 451/59 |
| 5,254,201 | 10/1993 | Konda et al. ............. 156/344 |
| 5,445,555 | 8/1995 | Tokura et al. ............. 451/28 |
| 5,466,325 | 11/1995 | Mizuno et al. ........... 156/344 |
| 5,520,865 | 5/1996 | Sargent, III et al. ..... 264/106 |
| 5,619,898 | 4/1997 | Witt .......................... 83/870 |
| 5,785,795 | 7/1998 | Ryan et al. ............... 156/344 |
| 5,830,306 | 11/1998 | Hinson, II ................ 156/248 |

Primary Examiner—Mark A. Osele
Attorney, Agent, or Firm—Hill & Simpson

[57] ABSTRACT

The present invention provides an optical disc recycling method for recycling optical disc including at least a light transmitting substrate and at least one metal layer containing a metal such as aluminium and gold provided on one side of the substrate. An adhesive member is adhered to the substrate side having the metal containing layer and the adhesive member adhered to the metal containing layer on the substrate is peeled off so as to separate the metal containing layer from the substrate.

22 Claims, 7 Drawing Sheets

OPTICAL RECORDING DISC RECYCLING METHOD

BACKGROUND OF THE INVENTION

1. Field of the Invention

The present invention relates to an optical disc recycling method and in particular, to a method for recycling an optical disc having a layer containing a metal.

2. Description of the Prior Art

A great amount of optical discs are produced in and out of Japan for various applications such as a so-called compact disc for music, a CD-ROM optical disc for a personal computer, a CD-ROM optical disc for a video game, and a write-once optical disc.

Consequently, even with a small defect ratio, a great amount of defective discs are produced in total to be discarded.

These defective discs have been collected by a discarding company which crushes the defective discs into pieces and throws them away in the ground. This is because it is difficult to recycle an optical disc having layered configuration consisting of a substrate made from an optical transparent resin material such as a polycarbonate, metal layers of a reflection film made from aluminium for reflecting a laser beam and a recording layer made from an optical recording material, as well as a protection layer made from an ultraviolet-setting resin and a label printing layer.

On the other hand, from the ecological viewpoint, an attempt has also been made to recycle these optical discs. For example, the discs to be discarded are crushed as they are mixing the metal layers, protection layer, label printing layer and the like, so as to be used as a molding material. It has also been suggested to remove the metal layer and the other layers from the substrate by way of mechanical polishing or chemical processing, so as to obtain a molding material.

However, the former results in that the recycled resin material contain a plenty of impurities such as metal from the metal layers and has problem that a molded body from the recycled resin material is unstable in bending strength and bending elasticity and its application is limited.

On the other hand, the latter method of recycling enables to obtain a comparatively pure resin material but the mechanical polishing or chemical processing requires an equipment of high costs and has a problem in the processing efficiency. When a chemical processing is employed a plenty of chemicals is to be used, which in turn brings about an ecological problem of secondary pollution.

In a case of write-once optical recording disc such as a CD-R disc, a precious metal such as gold is often used for the reflection layer, but recycling of such a precious metal is not considered in the aforementioned recycling methods. For the CD-R disc, for example, see U.S. Pat. No. 4,940,618 and U.S. Pat. No. 4,990,388.

SUMMARY OF THE INVENTION

It is therefore an object of the present invention to provide an optical disc recycling method which resolves the above-mentioned problems.

According to the present invention, there is provided an optical disc recycling method for recycling an optical disc having at least a light transmitting substrate and a metal layer on one side of the substrate. This recycling method includes an adhesion step for adhering an adhesive member to the substrate side having a metal layer, and a separation step for peeling out the adhesive member so as to remove the metal layer from the substrate.

According to the present invention there is provided an optical disc recycling method for recycling an optical disc having at least a substrate formed by a light transmitting synthetic resin, a metal containing layer provided on one side of the substrate, and a protection layer made from a synthetic resin material for protecting the metal containing layer. This recycling method includes an adhesion step for adhering an adhesive member onto the metal containing layer and a separation step for peeling out the adhesive member so as to separate the protection layer and the metal containing layer from the substrate.

DETAILED DESCRIPTION OF THE PREFERRED EMBODIMENTS

Description will now be directed to an optical disc recycling method according to the present invention with reference to the attached drawings.

Figure 1:
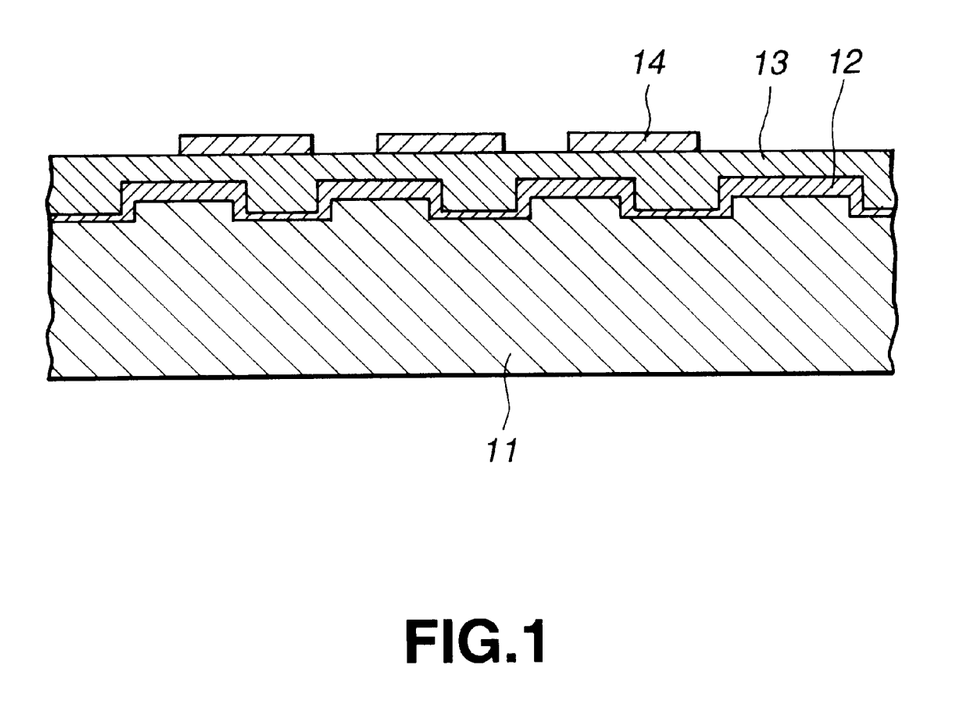
FIG. 1 is a cross sectional view of an essential portion of the configuration of an optical disc used in the present invention.

An optical disc dedicated to reproduction such as a so-called compact disc and a recordable optical disc (hereinafter, referred to simply as an optical disc) which is subjected to the recycling based on the recycling method according to the present invention, as shown in FIG. 1, has a substrate 11, a metal layer 12, and a protection layer 13. The substrate 11 is formed into a disc shape having a hole at the center by way of injection molding a light transmitting synthetic resin material such as polycarbonate. If the optical disc is dedicated for reproduction, the substrate 11 has one side on which a track consisting of a plurality of pits is formed in a spiral state or in a coaxial state. If the optical disc is a recordable optical disc, the substrate 11 has one side on which a pregroove is formed in a spiral state or in a coaxial state. An optical beam injected from an optical pickup of a recording and/or reproduction apparatus is applied from the other side of this substrate 11. The metal layer 12 is formed so as to cover the side of the substrate 11 having the pits or pregroove. In a case of a reproduction-dedicated optical disc, this metal layer 12 is formed by way of deposition or sputtering using a metal such as aluminium on one of the sides of the substrate 11. In a case of a recordable optical disc, the metal layer 2 is formed on one side of the substrate 11 by way of deposition or sputtering using an optical recording material which is recordable. In the latter case, the metal layer 12 made from a recordable optical recording material is covered with a reflection layer made from aluminum or the like if necessary.

In a case of write-once optical disc as the recordable optical disc, one side of the substrate 11 is coated with an organic pigment material as a light absorbing layer, which is covered with the metal layer 12 made from a metal.

The metal layer 12 thus provided is protected by the protection layer 13 made from an ultraviolet-setting resin or the like. The protection layer 13 is formed on one side of the substrate 11 so as to cover the entire surface of the metal layer 12. On the surface of this protection layer 13 is printed a label 14.

Figure 2:
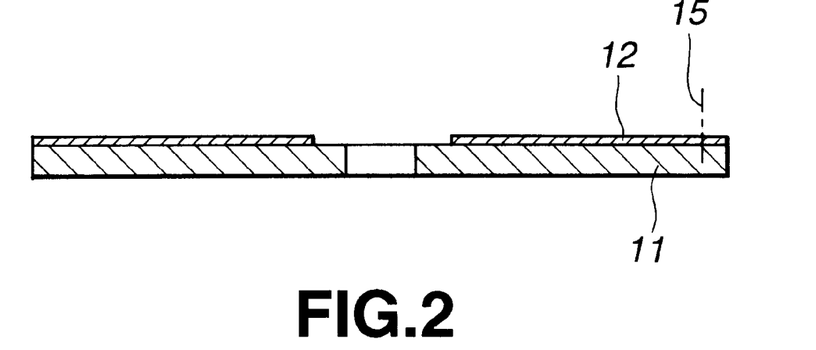
FIG. 2 is a cross sectional view showing a simplified configuration of the optical disc.
Figure 3:
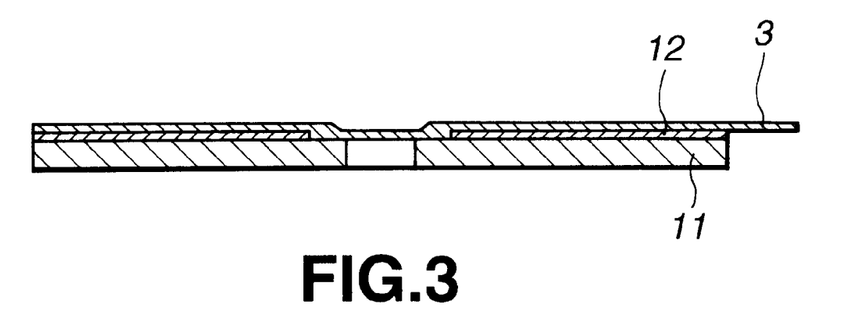
FIG. 3 is a cross sectional view showing a peeling-off adhesive film adhering to an optical disc.

For recycling an optical disc having a metal layer 12 formed on a substrate 11 as shown in FIG. 1 or FIG. 2, firstly, as shown in FIG. 3, a member having an adhesive characteristic such as an adhesive film 3 is put on the side where the metal layer 12 is formed and a predetermined pressure is applied for adhesion if necessary.

This adhesive film 3 (hereinafter, referred to as peeling-out adhesive film) may be any film having an adhesion property such as: an adhesive film having an adhesion layer made from an agglutinating material; an adhesive film having an adhesive layer made from a heat-melting material; an adhesive film having an adhesive layer made from a material exhibiting an adhesion property when activated by water or an organic solvent, an adhesive film made from a heat-melting material; and the like.

Figure 4:
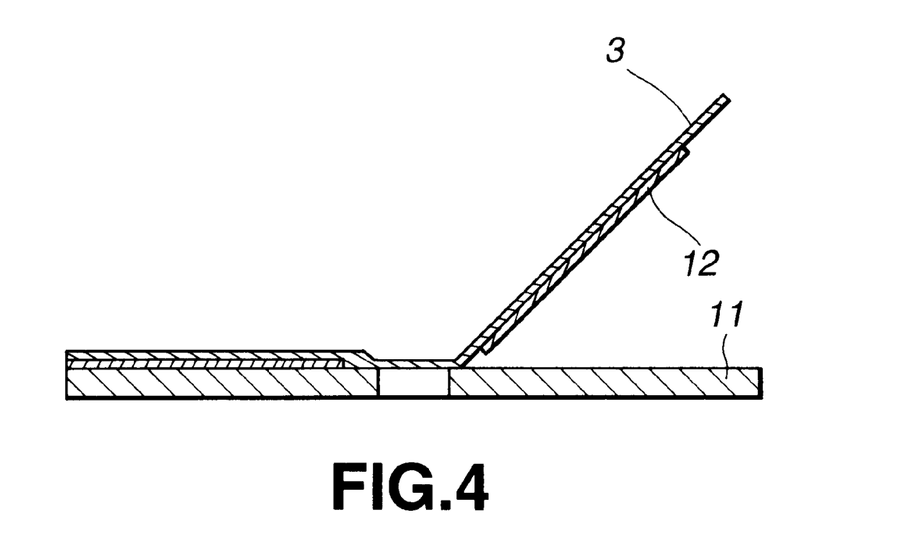
FIG. 4 is a cross sectional view showing the peeling-off adhesive film peeled off from the optical disc.

Next, as shown in FIG. 4, the peeling-out adhesive film 3 is peeled off from the substrate 11. As a result, the metal layer is separated from the substrate 11 and attached to the peeling-out adhesive film 3.

With this operation, what is separated and removed is a metal layer 12 such as a reflection layer made from aluminium or gold for reflecting a laser beam used for signal recording/reproduction and a recording layer made from an optical recording material as a metal material. Normally, as shown in FIG. 1, on this metal layer 12 are formed the protection layer 13 and the label layer 14, which are also separated from the substrate 11 together with the metal layer 12.

When such an optical disc is subjected to the aforementioned recycling process, separation occurs between the metal layer 12 as the reflection layer and the substrate 11. As a result, the metal layer 12, the protection layer 13, and the label layer 14 are transferred to the adhesive film 3 and separated from the substrate 11.

In a case when the protection layer 13 and the label layer 14 are formed on the metal layer 12, or in a case when the adhesion between the metal layer and the substrate is preferable, a comparatively strong force is required for separation between the metal layer 12 and the substrate 11, i.e., for peeling out of the peeling-out adhesive film 3, or peeling-out itself may become difficult. In such a case, as shown in FIG. 2, a cutting 15 is formed in advance from the side having the protection layer toward the other side of the optical disc, which facilitates the aforementioned separation.

The cutting 15 preferably has a depth through the protection layer 13 and the label layer 14 reaching the metal layer 12, and its size may be small. For example, if a scar of several mm is provided on the disc outer circumferential surface in the tangential direction of the optical disc, the separation starts at this scar 5 and the metal layer 12 and the protection layer 13 can easily be separated from the substrate.

After the metal layer 12 and the protection layer 13 are separated and removed, the substrate 11 contains only a resin material such as polycarbonate. The resin material constituting this substrate 11 has a superior fluidity and transparency, serving as a material having least optical distortion and contamination, which can be recycled to obtain a high quality resin material.

On the other hand, the peeled off metal layer 12 can also be recycled. For example, when the metal layer is transferred together with the protection layer 13 and the label layer 14 to the peeling-out adhesive film, the metal layer 12 which is exposed on the peeling surface can easily be recovered.

More specifically, for recovery of the metal layer 12, another adhesive film (hereinafter, referred to as a recovery adhesive film) is placed on the peeling-off adhesive film 3, and the recovery adhesive film is peeled off from the peeling-off adhesive sheet. In this process, the metal layer 12 is separated from the protection layer 13 and the metal layer 12 alone is transferred onto the recovery adhesive film, leaving the protection layer 13 and the label layer 14 on the peeling-off adhesive film.

Here, if the recovery adhesive film uses an adhesive which is soluble in water or in an organic solvent, the adhesive can be solved so as to separate the metal layer 12 alone from the recovery adhesive film.

When the recovery adhesive film used for separation of the metal layer 12 from the protection layer 13 and/or the label layer is an adhesive film coated with a water-soluble adhesive, only by solving this adhesive by water, the metal layer 12 can easily separated and recovered from the recovery adhesive film. Similarly, when the recovery adhesive film is an adhesive film coated with an adhesive soluble by an organic solvent, after the metal layer 12 is separated from the protection layer 13 and/or the label layer 14, this adhesive is solved by the organic solvent, thus enabling to separate and recover the metal layer 12 alone from the recovery adhesive film.

In a case of a write-once optical disc, a precious metal such as gold is used for the metal layer as a reflection layer formed on the absorption layer made from an organic pigment material. If the metal layer made from gold can be separated from the optical disc for reuse, its economic effect is great.

The basic method for optical disc recycling has been described. The recycling method according to the present invention can be realized as a continuous system which can significantly enhance its effect.

Figure 5:
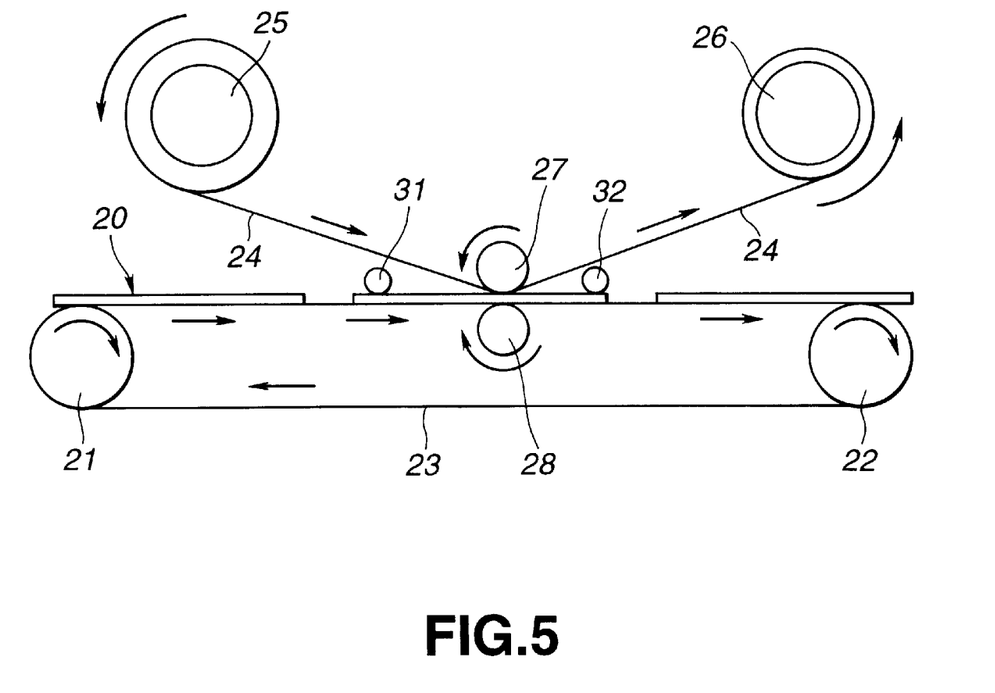
FIG. 5 schematically shows a system for continuously carrying out peeling off of the metal layer from the substrate according to the present invention.

FIG. 5 shows a configuration example of a system for continuously separating the metal layer from the substrates.

In this continuous separation system, an optical disc 20 is placed on a belt conveyer 23 extending between and driven by a pair of rollers 21 and 22, so as to be successively subjected to recycling processes which will be detailed below.

A peeling-out adhesive film 24 is fed from a feed roller 25 interlocked with the belt conveyer 23 and wound up by a take-up roller 26. The peeling-out adhesive film 24 is pressed to a side of the optical disc 20 having a metal layer and/or a protection layer, with a predetermined pressure by a pair of pressing rollers 27 and 28, and then peeled off.

Figure 6:
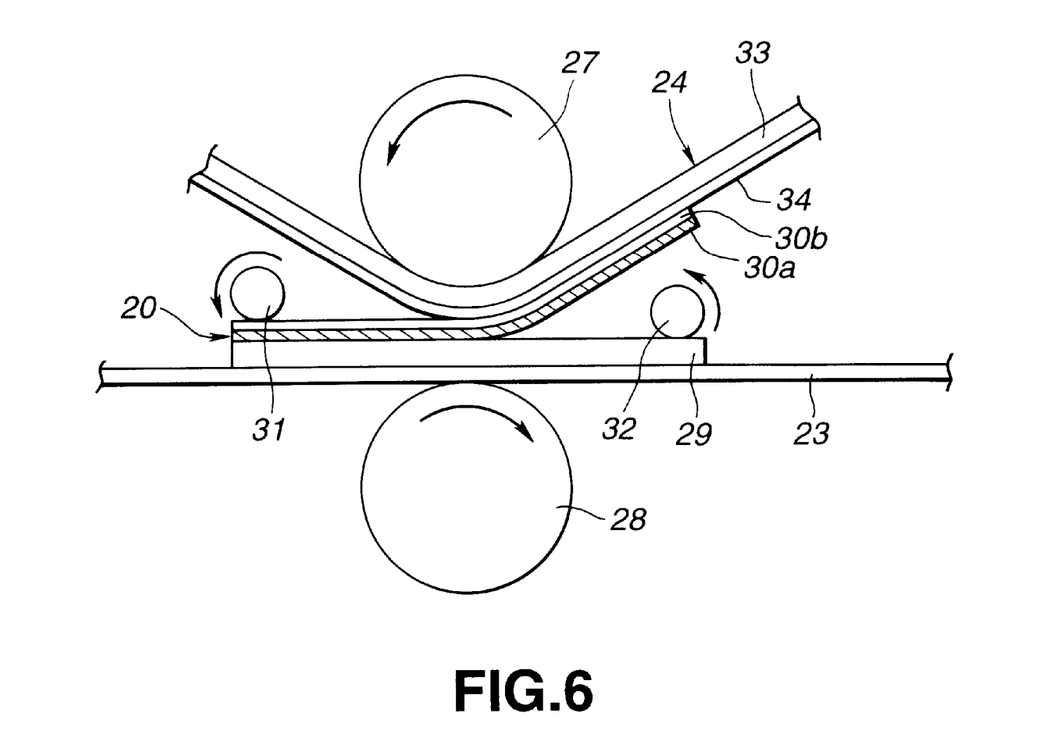
FIG. 6 schematically shows a process of peeling off of the peeling-off adhesive film so as to separate the metal layer from the substrate.

FIG. 6 shows a recycling step for adhesion of this peeling-out adhesive film 24 and peeling out of the metal layer from the substrate.

An optical disc 20 includes a substrate 29 on which a metal layer 30a and a protection layer 30b are formed. At the moment when the peeling-out adhesive film 24 is applied to the optical disc 20 by the pressing rollers 27 and 28, the substrate 29 is pressed against the belt conveyer 23 by a pair of fixing rollers 31 and 32, so as to prevent separation of the substrate 29 from the belt conveyer 23. When the metal layer 30a is peeled off and separated from the substrate 29 by the adhesive film 24, the substrate is fixed by the fixing rollers on the belt conveyer 23, assuring separation from the metal layer 30a.

The peeling-out film 24 includes a, for example, a polyester film 33 serving as a base which is coated by an adhesive and the like, forming an adhesive layer 34. The peeling-out film 24 is sandwiched together with the optical disc 20 and the belt conveyer 23 by the pressing rollers 27 and 28 and the adhesive layer 34 is pressed against to the side of the optical disc 20 having the metal layer 30a and the protection layer 30b. At this moment, one of the roller 27 and 28 is pressed to the other by an urging mechanism (not depicted) and the adhesive layer 34 is applied with a predetermined pressure so as to be layer over the optical disc 20.

Next, the peeling-out adhesive film 24 which has passed through the pressing rollers 27 and 28 is pulled by the take-up roller 26 in the direction of separation from the optical disc and as shown in FIG. 6, the adhesive film 24 is peeled off from the substrate 29. At this moment, separation occurs between the substrate 29 and the metal layer 30a and the metal layer 30 together with the protection layer 30b is transferred to the peeling-off adhesive film 24 and peeled off from the substrate 29. This is because the force operating between the adhesive film 24 and the protection layer 30b formed o the metal layer 30a is greater then the force operating between the substrate 29 and the metal layer 30.

The metal layer 30a peeled off from the substrate 29 is retained together with the protection layer 30b on the adhesive film 24 and wound by the take-up roller 26.

Thus, a plurality of optical discs are continuously subjected to separation of the metal layer 30a from the substrate 29. The substrate 29 separated can be reused as a resin material as will be detailed later. The metal layer 30a separated from the substrate 29 can be continuously recovered by a system as follows.

Figure 7:
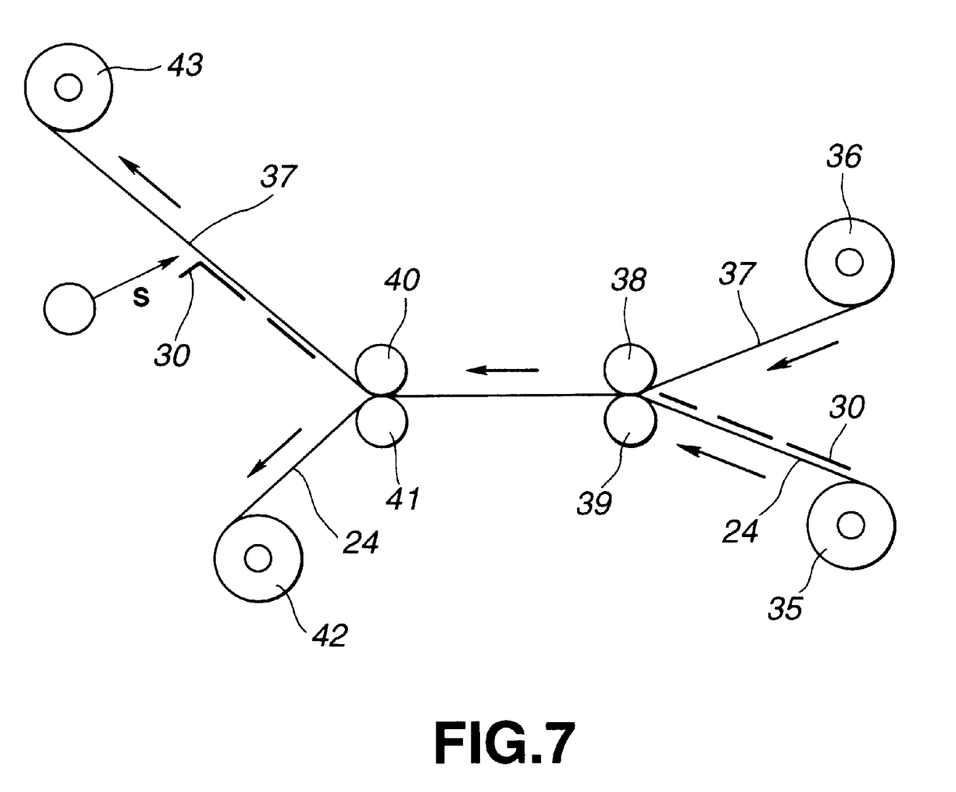
FIG. 7 schematically shows a system for continuously recovering the metal layer separated from the substrate.

In order to separate and recover the metal layer 30a which has been wound together with the peeling-out adhesive film 24 and the protection layer 30b by the take-up roller 26, as shown in FIG. 7, the peeling-out adhesive film 24 wound by the take-up roller 26 is moved as a first adhesive film roll 35 to a separation/recovery system in which the adhesive film 24 is pressed against an adhesive film 37 (hereinafter, referred to as recovery adhesive film) supplied from a second adhesive film roll 36.

That is, the peeling-out adhesive film 24 is fed from the first adhesive film roll 35 and the recovery adhesive film 37 is fed from the second adhesive film roll 36, and the surface of the peeling-out adhesive film retaining the metal layer 30a is pressed against the surface of the recovery adhesive film 37 coated with an adhesive.

Figure 8:
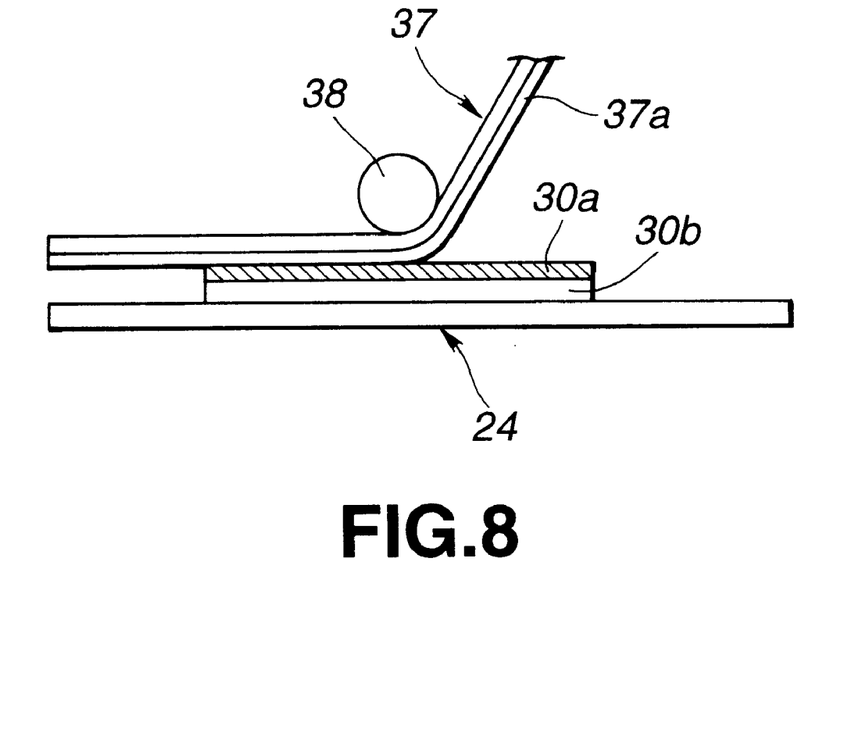
FIG. 8 schematically shows a recovery adhesive film placed on the peeling-off adhesive sheet.

FIG. 8 shows a process to peel off and separate the metal layer 30a from the peeling-out adhesive film 24 by using the recovery adhesive film 37. An adhesive layer 37a of the recovery adhesive film 37 is put on and pressed by a pair of rollers 38 and 39 against the metal layer 30a which has been transferred together with the protection layer 30b onto the peeling-out adhesive film 24.

Here, the recovery adhesive film 37 is an adhesive film including a base film coated with a water-soluble adhesive or an adhesive film coated with an adhesive soluble in an organic solvent.

Figure 9:
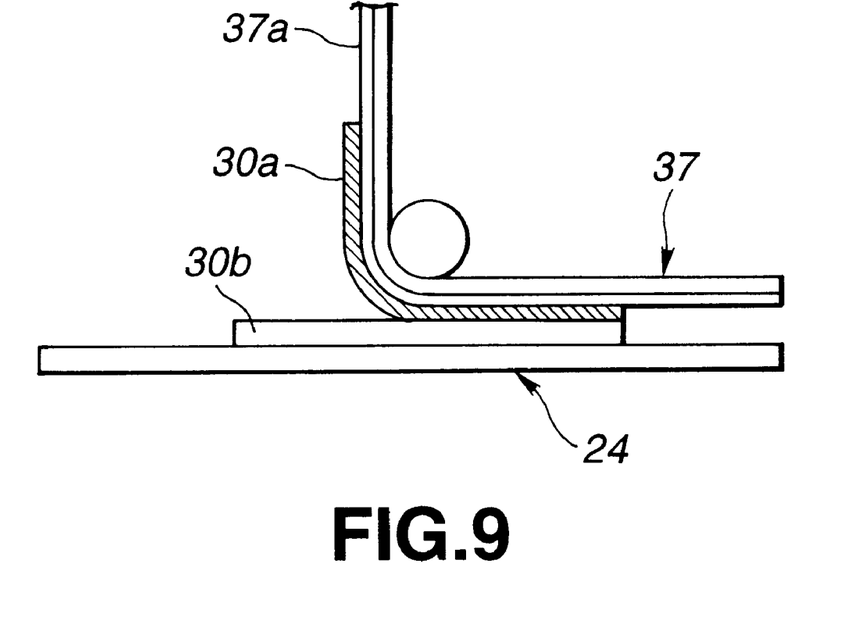
FIG. 9 schematically shows a process to peel off the recovery adhesive film from the peeling-off adhesive film.

These adhesive films 24 and 37 pressed to each other while traveling from the pressing rollers 38 and 39 to peeling-out rollers 40 and 41. After passing through the peeling-out rollers 40 and 41, as shown in FIG. 7, these films are respectively pulled by take-up rollers 42 and 43 in directions, intersecting with a right angle and wound by the rollers 42 and 43. As shown in FIG. 9, the metal layer 30a is transferred onto the adhesive film 37, leaving the protection layer 30b on the adhesive film 24.

Thus, the metal layer 30a which has been transferred onto and retained by the peeling-out adhesive film 24 together with the protection layer 30b and the label layer is separated from the protection layer 30b and the label layer and transferred onto and retained by the recovery adhesive film 37. That is, as shown in FIGS. 7 through 9, the films 24 and 37 are respectively taken up by the roller 42 and 43 while the metal layer 30a is separated from the protection layer 30b so that the metal layer 30a alone is transferred onto the adhesive film 37. This is because the force binding the metal layer 30 and the protection layer 30b is smaller than the force operating between the metal layer 30a and the adhesive film 37 and the force operating between the protection layer 30b and the adhesive film 24.

The recovery adhesive film 37 retaining the metal layer 30a before reaching the take-up roller 43 is subjected to jet of water or an organic solvent so as to separate and recover the metal layer 30a from the recovery adhesive film 37.

Figure 10:
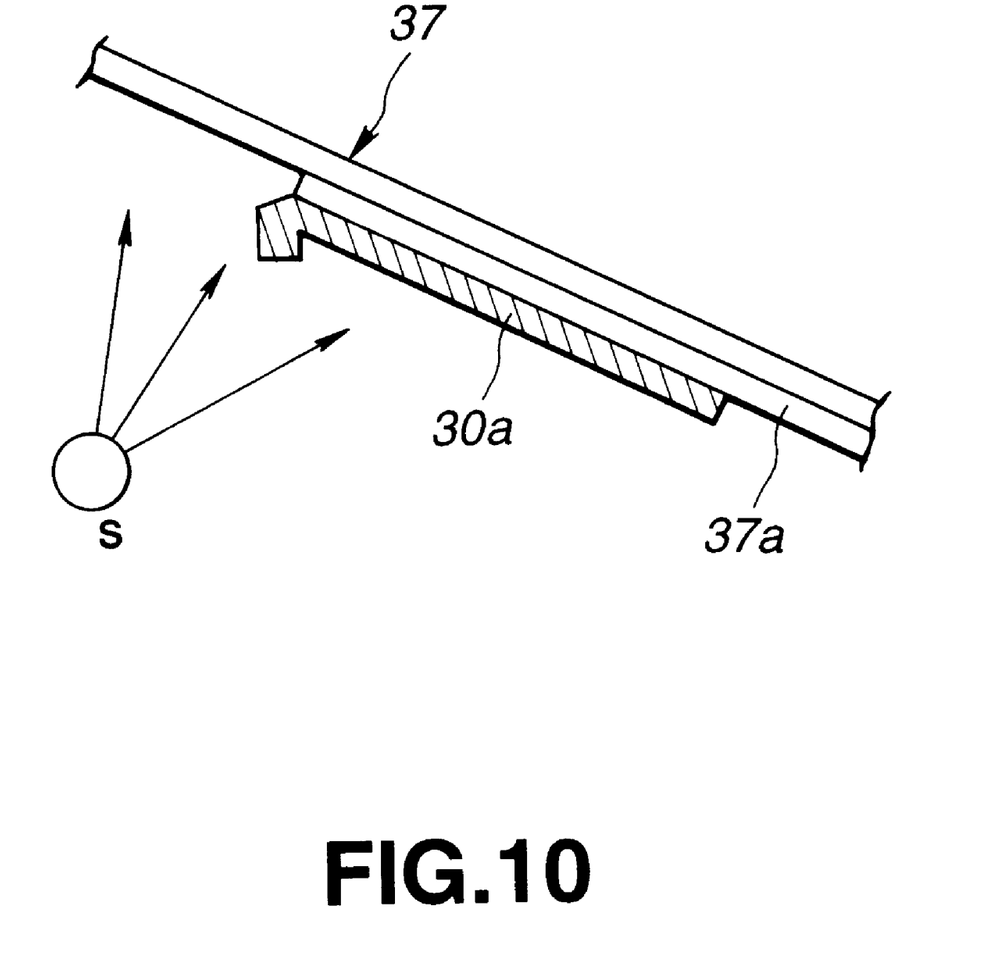
FIG. 10 schematically shows a process of applying a shower to the recovery adhesive film.

For example, in a case when the recovery adhesive film 37 is an adhesive film coated with a water-soluble adhesive, as shown in FIG. 7, water shower S is applied to the recovery adhesive film 37 for solving the adhesive layer 37a as shown in FIG. 10, so that the metal layer 30a is separated from the recovery adhesive film 37. The metal layer 30a separated is filtered and washed for recovery.

Similarly, in a case when the recovery adhesive film 37 is an adhesive film coated with an adhesive soluble in an organic solvent, an organic solvent shower is applied to the recovery adhesive film 37 for separating the metal layer 30a for recovery.

Description will now be directed to specific examples.

Example 1

As the peeling-out adhesive sheet, an adhesive film having an adhesive layer which is an adhesive material (trade name: polyester adhesive tape No. 31B produced by Nitto Denko Co., Ltd.) was applied to a so-called compact disc for music as the optical disc for peeling out a reflection film as the metal layer and a protection film so as to recover the synthetic resin material constituting the substrate.

As a result, the reflection film made from aluminium as the metal layer, the protection film and the label printing film were transferred and separated onto the adhesive film, enabling to recover the synthetic resin material constituting the substrate, which is polycarbonate in this example, without containing impurities such as the reflection film.

Example 2

As the peeling-out adhesive sheet, an adhesive film having an adhesive layer which is a heat-melting material (trade name: Elfan PH413 produced by Nippon Matai Co., Ltd.) was applied to a compact disc in the same way as in Example 1, with a temperature of 120° C. After cooling down to the room temperature, the adhesive film was peeled off from the substrate so as to separate the reflection film as the metal layer and the protection film from the substrate for recovery of the substrate material.

As a result, the aluminum reflection film as the metal layer, the protection film and the label printing film were transferred and separated onto the peeling-out adhesive film, enabling to recover the synthetic resin constituting the substrate, which is polycarbonate in this case, without containing impurities such as the reflection film.

Example 3

As the peeling-out adhesive sheet, an adhesive film having an adhesive layer which is activated by an organic solvent (trade name: SV vanis coated paper produced by Suzuki Kansi Co., Ltd.) was applied to a music compact disc in the same ways as the aforementioned Examples. The adhesive film was subjected to activation with ethyl alcohol and applied to the compact disc. After dried at a room temperature, the adhesive film was peeled off from the optical disc so as to peel off and separate the reflection film and the protection film from the substrate for recovery of the synthetic resin material constituting the substrate.

As a result, the aluminium reflection film as the metal layer, the protection film, and the label printing film were transferred and separated onto the adhesive film, enabling to recover polycarbonate as the synthetic resin material constituting the substrate without containing impurities such as the reflection film.

Example 4

The peeling-out adhesive films used in the aforementioned Examples 1 through 3 have a structure of a base coated with an adhesive, but this Example used an adhesive film as a single body (trade name: Elastomer PH402 produced by Nippon Matai Co., Ltd.). That is, the film was applied to a music compact disc in the same way as in the aforementioned Examples, with a temperature of 130° C. After cooling down to a room temperature, the adhesive film was peeled off from the optical disc so as to peel off and separate the aluminium reflection film from the substrate for recovery of the synthetic resin material constituting the substrate.

As a result, the aluminium reflection film as the metal layer, the protection film, and the label printing film were transferred and separated onto the peeling-off adhesive film, enabling to recover the synthetic resin material constituting the substrate, which is polycarbonate in this example, without containing impurities such as the reflection film.

Example 5

As shown in FIG. 2, a cutting scar was caused in a outermost circumferential part on the side of the aforementioned music compact disc having the aluminium reflection film, the protection film, and the label printing film, and the synthetic resin material constituting the substrate was recovered by using the peeling-out adhesive film used in Example 1.

The initial peeling force required was 700 g/cm for separation of the reflection film and the protection film from the substrate when no cutting scar was caused. In this example when a cutting scar was present, the initial peeling force required for separation from the substrate was 450 g/cm. Thus, when the cutting scar is present, the initial peeling force required is small and it is easier to recover the synthetic resin material constituting the substrate.

Recovery of the Synthetic Resin Material of the Substrate

The synthetic resin material, polycarbonate, constituting the substrate recovered in the aforementioned Examples 1 through 5 was crushed into pieces and made into pellets by using an extruder, which is further molded by an injection molding apparatus into samples. These samples were subjected to tests to determine their mechanical characteristics.

For preparing a comparative example, a music compact disc with the aluminium reflection film, protection film and label printing film as they are was crushed into pieces and made into pellets, which were subjected to injection molding to complete a comparative example.

As a reference example, the same tests were carried out on a resin material, i.e., polycarbonate product prior to disc molding.

The test results are shown in Table 1.

TABLE 1

|  | Tensile strength (kgf/cm$^2$) | Bending strength (kgf/cm$^2$) | Elastic modulus (kgf/cm$^2$) | Izot impact |
|---|---|---|---|---|
| Examples | 610 | 1000 | 23000 | 5.9 |
| Comparative example | 600 | 900 | 20000 | 3.5 |
| Reference example | 650 | 960 | 24000 | 8 |

The samples obtained as the examples have a transparent external view containing no impurities and as can be seen from Table 1, these samples have elastic modulus and bending strength in the same order of the reference example and superior characteristics values than the comparative example.

The samples have Izot impact value slightly lower than the reference example but the value is sufficient to use the samples as a general molding product.

Example 6

The peeling-out adhesive film used in Example 2 for peeling off the reflection film was used for recovering a metal material used in the recording layer and the reflection film by dissolving aluminium in an acidic and alkali aqueous solution.

As a result, the aluminum constituting the reflection film as a metal layer exposed on the surface of the adhesive film recovered was subjected to a chemical treatment using an aqueous solution of weak acid (0.1 mol solution of hydrochrolic acid) or weak alkali (0.1 mol of sodium hydroxide) and it was found that the aluminum is easily dissolved in the aqueous solution.

From this it is clear that it is possible employ a dissolving recovery method appropriate to a metal material used in the recording layer and the reflection film as the metal layer, so as to isolate and reuse the metal material constituting the metal layer.

Example 7

In the aforementioned Example 6, the metal was recovered as a metal salt with the chemical used for dissolving the metal. In order to recover the metal as a simple substance, it is necessary to carry out a chemical treatment such as reduction of the metal oxide.

In this example, it was tried to obtain the metal constituting the metal layer as a simple substance without requiring any chemical treatment.

That is, the peeling-off adhesive film used in Example 2 was recovered and it was confirmed that the aluminium reflection film was exposed on the surface of the peeling-off adhesive film. A recovery adhesive film having an adhesive layer soluble in water was applied to the surface of this reflection film, which was then peeled off from the adhesive film of Example 2, so as to separate and recover the metal constituting the reflection film, i.e., aluminium in this example.

The recovery adhesive film was prepared by coating a polyester film with an aqueous solution containing as a main content polyvinyl alcohol which is a water-soluble polymer (trade name: PVA-505 produced by Clare Co., Ltd.), to form an adhesive layer.

The adhesive layer of this recovery adhesive film was fused onto the aluminium reflection film on the peeling-off adhesive film by using a roller heated to 120° C. After cooling down to a room temperature, the adhesive film of Experiment 2 was separated from the recovery adhesive film so that the aluminium film was transferred onto the recovery adhesive film.

The recovery adhesive film retaining the aluminium film was immersed in water so as to dissolve the adhesive layer of the recovery adhesive film. After carrying out filtration and washing, the aluminium film alone was taken out.

In this example, polyvinyl alcohol was used as a water-soluble polymer material, but the material may be other than polyvinyl alcohol if it is soluble in water. In this example, as the recovery adhesive film, an adhesive film of heat-melting type was used, but it is also possible to use an adhesive film of agglutinating type.

Example 8

A recovery adhesive film was prepared by coating a polyester film with a polymer material soluble in an organic solvent (trade name: Pilon 300 produced by Toyobo Co., Ltd.) to form an adhesive layer.

In the same way as in Example 7, the recovery adhesive film was fused onto the aluminium film constituting the reflection film of the optical disc and adhering to the peeling-off adhesive film, by using a roller heated to 130° C. After cooling down to a room temperature, the peeling-off adhesive film of Experiment 2 was peeled off from the recovery adhesive film so that the aluminium film was transferred onto the recovery adhesive film.

The recovery adhesive film retaining this aluminium film was immersed in ethyl acetate so as to dissolve the adhesive layer of the recovery adhesive sheet, and after filtration and washing, the aluminum film alone was taken out.

In this example, Pylon 300 (trade name) was as the polymer material soluble in an organic, but it is also use any other material if soluble in an organic solvent. In this example, the adhesive film of heat-melting type was used as the recovery adhesive film, but it is also to use an adhesive film of agglutinating type.

As is clear from the above-mentioned, according to the present invention, it is possible to isolate a substrate material from the metal layer (reflection layer, recording layer), protection layer, and label layer by a simple method using an adhesive film without employing any chemical or mechanical means. Thus, it is possible to isolate the synthetic resin constituting an optical disc substrate with a high efficiency.

It is also possible to easily recover the metal material used for the recording layer and the reflection layer.

This enables to effectively re-use the resin material and the metal material, offering a great merit in the ecological and economical aspects.

In the aforementioned Examples, explanation was given on a case using an adhesive film consisting of a film-shaped base coated with an adhesive layer, but it is also possible to use a sheet-shaped base having an adhesive layer or a band-shaped member having a width greater than the diameter of the optical disc on which an adhesive layer is provided. The present can be modified in various ways without departing from the score of the invention.

What is claimed is:

1. An optical disc recycling method for recycling an optical disc including at least a light transmitting substrate and a layer containing a metal provided on at least one side of said substrate, said method comprising:

a step of placing an adhesive member on the substrate side having said metal containing layer; and a step of peeling off said adhesive member adhered to said metal containing layer from said substrate so as to separate said metal containing layer from said substrate.

2. An optical disc recycling method as claimed in claim 1, said method further comprising, prior to said step of placing the adhesive member on the substrate, a step of causing a cutting scar on said optical disc, so as to facilitate separation of said metal containing layer from said substrate.

3. An optical disc recycling method as claimed in claim 2, wherein said step of causing a cutting scar is carried out from the substrate side having said metal containing layer toward the other side of said optical disc.

4. An optical disc recycling method as claimed in claim 2, wherein said cutting scar is formed so as to have a depth reaching at least said metal containing layer.

5. An optical disc recycling method as claimed in claim 1, said method further comprising a step of separating said metal containing layer from said adhesive member separated from said substrate.

6. An optical disc recycling method as claimed in claim 5, wherein said step of separating said metal containing layer from said adhesive member is realized by adhering a second adhesive member onto the metal containing layer so that said metal containing layer is transferred onto said second adhesive member.

7. An optical disc recycling method as claimed in claim 6, wherein said second adhesive member is a member including a base member coated with a water-soluble adhesive.

8. An optical disc recycling method as claimed in claim 7, wherein said method further comprises a step of dissolving in water said water-soluble adhesive of said second adhesive member, so as to separate and recover said metal containing layer from said second adhesive member.

9. An optical disc recycling method as claimed in claim 6, wherein said second adhesive member is a member including a base member coated with an adhesive soluble in an organic solvent.

10. An optical disc recycling method as claimed in claim 9, wherein said method further comprises a step of dissolving in an organic solvent said adhesive soluble in an organic solvent of said second adhesive member, so as to separate and recover said metal containing layer from said second adhesive member.

11. An optical disc recycling method as claimed in claim 1, wherein said adhesive member is a member having an adhesive layer made from an adhesive material.

12. An optical disc recycling method for recycling an optical disc including at least a substrate made from a light transmitting synthetic resin, at least one metal containing layer provided on one side of said substrate, and a protection layer formed from a synthetic resin so as to protect said metal containing layer, said method comprising:

a step of placing an adhesive member onto the substrate side having said metal containing layer; and a step of peeling off said adhesive member adhered to said substrate side having said metal containing layer, so as to separate said protection layer and said metal containing layer from said substrate.

13. An optical disc recycling method as claimed in claim 12, said method further comprising, prior to said step of placing the adhesive member on the substrate, a step of causing a cutting scar on said optical disc, so as to facilitate separation of said metal containing layer from said substrate.

14. An optical disc recycling method as claimed in claim 13, wherein said step of causing a cutting scar is carried out from the substrate side having said metal containing layer toward the other side of said optical disc.

15. An optical disc recycling method as claimed in claim 2, wherein said cutting scar is formed so as to have a depth at least cutting through said protection layer and reaching said metal containing layer.

16. An optical disc recycling method as claimed in claim 12, said method further comprising a step of separating said metal containing layer from said adhesive member separated from said substrate.

17. An optical disc recycling method as claimed in claim 16, wherein said step of separating said metal containing layer from said adhesive member is realized by adhering a second adhesive member onto the metal containing layer so that said metal containing layer is separated from said protection layer and transferred onto said second adhesive member.

18. An optical disc recycling method as claimed in claim 17, wherein said second adhesive member is a member including a base member coated with a water-soluble adhesive.

19. An optical disc recycling method as claimed in claim 18, wherein said method further comprises a step of dissolving in water said water-soluble adhesive of said second adhesive member, so as to separate and recover said metal containing layer from said second adhesive member.

20. An optical disc recycling method as claimed in claim 17, wherein said second adhesive member is a member including a base member coated with an adhesive soluble in an organic solvent.

21. An optical disc recycling method as claimed in claim 20, wherein said method further comprises a step of dissolving in an organic solvent said adhesive soluble in an organic solvent of said second adhesive member, so as to separate and recover said metal containing layer from said second adhesive member.

22. An optical disc recycling method as claimed in claim 11, wherein said adhesive member is a member having an adhesive layer made from an adhesive material.

* * * * *